(No Model.)  2 Sheets—Sheet 1.

J. GOODNOUGH.
WALKING CULTIVATOR.

No. 307,539.  Patented Nov. 4, 1884.

WITNESSES.  INVENTOR.

(No Model.) 2 Sheets—Sheet 2.

J. GOODNOUGH.
WALKING CULTIVATOR.

No. 307,539. Patented Nov. 4, 1884.

WITNESSES.
O. L. Petitdidier
L. F. Kimberlin

INVENTOR.
John Goodnough
By C. P. Jacobs
Atty.

UNITED STATES PATENT OFFICE.

JOHN GOODNOUGH, OF INDIANAPOLIS, INDIANA.

WALKING-CULTIVATOR.

SPECIFICATION forming part of Letters Patent No. 307,539, dated November 4, 1884.

Application filed June 9, 1884. (No model.)

*To all whom it may concern:*

Be it known that I, JOHN GOODNOUGH, a resident of Indianapolis, Marion county, Indiana, have made certain new and useful Improvements in Walking-Cultivators, a description of which is set forth in the following specification, reference being made to the accompanying drawings, in the several figures of which like letters indicate like parts.

My invention relates to the construction of cultivator-plows, and is designed to provide a device wherein the shovels are so connected with a series of pivoted parallel bars that they may preserve a horizontal parallel motion when being moved from side to side in working, thus keeping the front of the shovel directly in the line of the work; second, to regulate, by means of a band-spring and its connections, the shovels, so that they may be lifted up when not at work, or held steadily down to the work, and to adjust, by means of an arched axle and sleeve-socket, the width of the gangs, and to provide suitable guides and rests for the plow-beams when lifted out of the ground.

Figure 1:
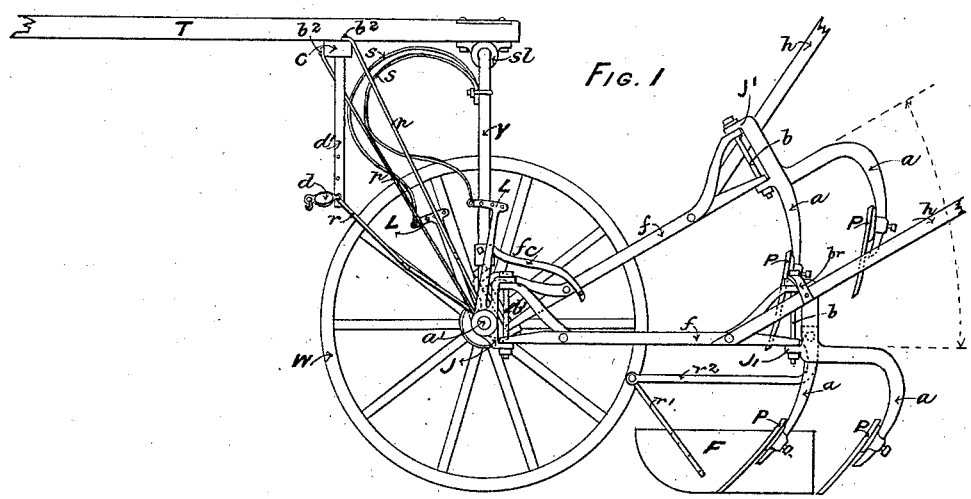
Figure 2:
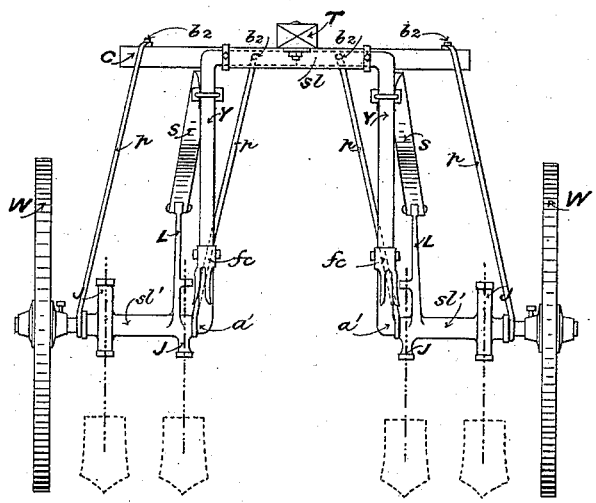
Figure 3:
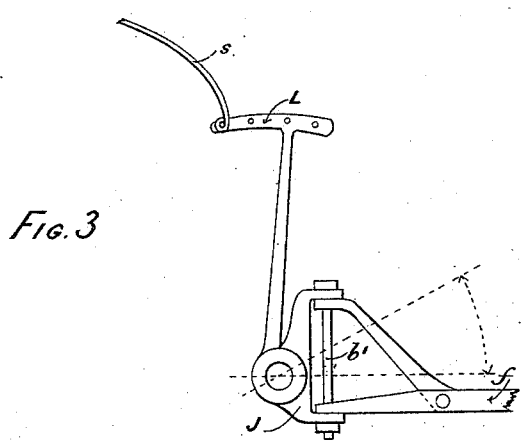
Figure 4:
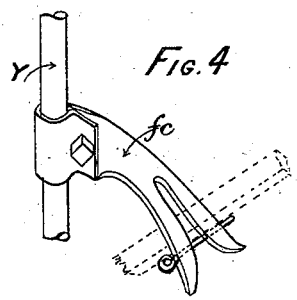
Figures 5, 6:
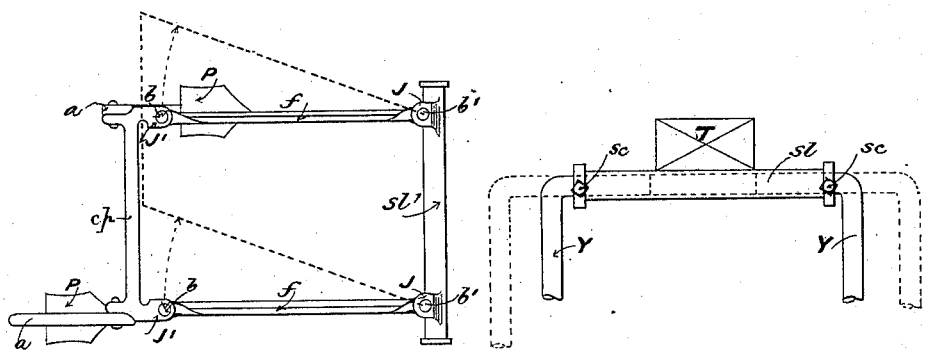

In the drawings, Figure 1 represents a side elevation of the plow, showing one-half the plow on the ground and one-half raised by the springs. For plainness of drawing the front wheel on this side is not shown. Fig. 2 represents a rear elevation of the plow with the plow attachments removed. The dotted lines show the normal position of the plow-blades when at work. The parallel-bar system maintaining the axles parallel with each other is also shown. Fig. 3 represents a side elevation of the plow-lifting arrangement, the long lever-arm and collar for plow-carrier being cast in one piece, which revolves around the axle. Fig. 4 represents a perspective view of the carrier, being an arrangement to keep the arms of the plow from side motion when the plows are raised. Fig. 5 is a plan view showing one of the supporting-frames. The dotted lines indicate the side parallel motion, which may be given to either frame by the plow-handle. Fig. 6 is a view showing the adjustable arch.

The dotted lines show the motion of the movable parts of the axle, and set-screws *sc* clamp the axles at any desired point.

Figs. 3, 4, 5, and 6 are on a larger scale than Figs. 1 and 2.

In detail T is the tongue, *c*, a cross-bar, from each end of which depend bars $d'$, to which the double-tree *d* is attached, and *r* is a jointed draft-rod connecting the double-tree with the axle $a'$. This axle is made in two parts, which are turned up to form the arch *y*, and the ends of the axles fit into the ends of a sleeve, *sl*, and may be pushed in or drawn out of the sleeve, thus narrowing or increasing the width between the wheels *w*, and of course between the two gangs of plows. Bolted to each side of the arch are springs *s*, one on each side, bent in the shape shown in Fig. 1, the lower end of each spring being fastened by a bolt or shackle to the cross-head of the lever L, which is cast integral with a sleeve, $sl'$, which is provided with jaws J, whose projections have holes through which bolts $b'$ pass, connecting the forked ends of the parallel bars of the frame *f* with such jaw J. Similar jaws, $J'$, are formed on the cross-piece *cp*, connecting the arms $a'$ at the rear, and a like connection is made here, as in front, to the forked rear end of the frame-bars *f*. The bolts in the rear are marked *b*. This method of connection in front and rear allows the parallel frame-bars *f* and their connections, including the shovels P, to be lifted and swung either right or left, for the bars *f*, moving on the bolts $b'$, in front preserving their parallelism in every position, as shown by the full and dotted lines in Fig. 5. The frame-carriers *fc* are clamped to the upright of the yoke *y*, as shown in Fig. 4, and when the bars are lifted they pass between the forks of the carrier and are prevented from having any side motion. Holes may be put through these forks and a bolt inserted below the bar *f*, on which it may rest securely when the plows are lifted up.

*h* are the handles, bolted to bars *f* and fastened by a bracket having holes for the bolts *b* to pass through, this same bolt holding the handle-bracket jaw of plow-arm, and the forked end of the bar *f*.

*a* is the curved arm, extending from the cross-piece *cp* backward and downward, to which the plows P are fastened.

*p p p p* are rods, two on each side of the axle, one end slipped over the axle and bolted at the other end to the cross-bar c. These rods, while they are so loosely pivoted as not to prevent the widening of the gangs by means of the adjustable arch, yet preserve the parallelism of the two parts of the axle, keeping them in line with each other.

F is a fender connected by rods r' r² and a suitable bolt or clamp to the upright part of arm a, and is adapted to be adjusted to different angles and positions between the shovels.

The parallel rods p p on each side the axle-yoke, at their upper ends, are thus arranged: The two inside ones have their upper ends flattened and curved edgewise and outward from the point where they are bolted to the cross-bar, making a sort of archway and giving more room for the corn to pass. Of the pair on each side, their lower ends are formed into eyes, which are slipped over the axle, one on the inside and the other on the outside of the sleeve sl'.

I am aware that iron brace-rods, connected with the axle at one end and at the other to a bar which forms a part of the arch, have been used in cultivators, and do not broadly claim the same as my invention; but, as will be seen, the brace-rods p p in my device are pivoted at their upper ends to a cross-bar, c, in front of the arch, and are so pivoted as to preserve their parallelism and yet allow the widening of the adjustable arch in the sleeve sl, and this combined arrangement is, I believe, found in no other device.

I am aware, too, that lifting and sustaining springs have been used in plows of this class, and do not broadly claim the same as my invention; but the springs heretofore used have been of a different shape and differently hung from mine, and the peculiar arrangement of my spring produces a new and better result. Thus, when my plow is lifted after it passes a certain point, the spring itself, from its peculiar shape and method of attachment, lifts the plow the rest of the way by its own elasticity, and in lowering it again, after the plow has passed the center, the force of the spring itself is exerted to hold the plow down steadily to the ground. This result is not accomplished by any spring device I have known, and I only claim upon this matter the peculiar arrangement of the spring herein shown.

The forked carrier fc is an improvement on the hook-rests heretofore used, as in my device the curved spring s holds the plow up, and the fork of the carrier prevents all lateral movement, and it is not necessary to lift the plow to release it from the carrier, but only to pin it down when the pin is removed. The pin is designed to be used only when the plow is being transported from place to place. The forked frame-bars f are also an improvement upon devices used in other plows. Their forked ends enter the jaws J J' in front and rear, and move freely upon the pivot-bolts b b', and are far preferable to the sleeve and clamps found in other devices.

What I claim, and desire to secure by Letters Patent, is the following.

1. The frame-bars f, forked at each end and adapted to swing freely in jaws J J' upon pivot-bolts, the jaws J, formed integral with the sleeve sl', mounted on axle a, the lever-arms L, also connected with such sleeve, the curved spring s, attached at its lower end to the head of lever L, and at its upper end to the side of the arch y, all combined in the manner and for the purpose hereinbefore described.

2. The forked carrier fc, bolted to the upright of the arch, substantially as and for the purpose herein described.

3. The frame-rods f, forked at each end and adapted to enter the jaws J in front, formed on sleeve sl', and the jaws J' in the rear, formed integral with the standards and cross-piece cp, and to swing freely on pivot-bolts b b' in such jaws, all combined substantially as and for the purposes described.

4. The axle a, divided in two parts at the top of the crank, the sleeve sl, for uniting the parts, the cross-bar c, attached to the tongue in front of the arch, formed by the parts of the axle, the parallel rods p p on each side the arch, bolted to the opposite sides of the cross-bar c at the upper end, and having eyes at their lower ends, which fit loosely over the axle, all combined substantially as and for the purpose described.

5. The bars f, forked at each end, pivoted in front to the jaws J of sleeve sl' by bolts b', and at the rear to jaws J' of cross-piece cp, connecting arms a, the plows P, and arms a, and handles h, all combined substantially as described.

6. The adjustable arch formed of uprights y, connected to axles a, the sleeve sl, for uniting the parts of the arch and allowing their adjustment to different widths, the parallel rods p p on each side such arch, pivoted at the upper end to cross-bar c in front of the arch, and mounted on axles on the outside of sleeves sl', a frame composed of parallel bars carrying plow-shovels, all combined substantially as and for the purpose described.

7. The frame-bars f, having forked ends adapted to fit on the inside of jaws J J' at front and rear, substantially as and for the purpose described.

8. The sleeve sl', having jaws J and lever L integral therewith, substantially as described.

9. The parallel rods p p on each side the arch y, their upper ends pivoted to the cross-bar c, as shown, their lower ends fitting loosely over the axle, in combination with the adjustable arch y, substantially as and for the purposes described.

Witness my hand June 3, 1884.

JOHN GOODNOUGH.

Witnesses:
C. P. JACOBS,
L. F. KIMBERLIN.